US008626399B2

(12) United States Patent
Takeuchi et al.

(10) Patent No.: US 8,626,399 B2
(45) Date of Patent: Jan. 7, 2014

(54) INVERTED VEHICLE AND METHOD OF GETTING ON/OFF THE INVERTED VEHICLE

(75) Inventors: Yushi Takeuchi, Nagakute (JP); Yusuke Enomoto, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/578,112

(22) PCT Filed: Aug. 30, 2010

(86) PCT No.: PCT/JP2010/005339
§ 371 (c)(1),
(2), (4) Date: Aug. 9, 2012

(87) PCT Pub. No.: WO2012/029087
PCT Pub. Date: Mar. 8, 2012

(65) Prior Publication Data
US 2012/0323450 A1    Dec. 20, 2012

(51) Int. Cl.
*G05D 1/00*    (2006.01)
(52) U.S. Cl.
USPC ............................................................ 701/49
(58) Field of Classification Search
USPC ................................ 701/49; 362/496, 543
See application file for complete search history.

(56) References Cited

U.S. PATENT DOCUMENTS

| 5,580,140 | A  | * | 12/1996 | Katz et al. ........................ 353/13 |
| 7,175,321 | B1 | * | 2/2007  | Lopez ............................ 362/496 |
| 7,192,172 | B1 | * | 3/2007  | Alberti ........................... 362/543 |
| 8,249,773 | B2 | * | 8/2012  | Kawada et al. ................... 701/36 |
| 8,325,027 | B2 | * | 12/2012 | Tee et al. ......................... 340/432 |
| 2011/0035101 | A1 | * | 2/2011 | Kawada et al. ................... 701/36 |

FOREIGN PATENT DOCUMENTS

| JP | 2004-074814 A | 3/2004 |
| JP | 2006-315666 A | 11/2006 |
| JP | 2010-023705 A | 2/2010 |
| JP | 2010-030569 A | 2/2010 |
| JP | 2010-149577 A | 7/2010 |
| JP | 2010-179874 A | 8/2010 |

OTHER PUBLICATIONS

International Search Report mailed Nov. 22, 2010 of PCT/JP2010/005339.

* cited by examiner

*Primary Examiner* — Mary Cheung
*Assistant Examiner* — Anne Mazzara
(74) *Attorney, Agent, or Firm* — Kenyon & Kenyon LLP (57) ABSTRACT

An inverted vehicle travels while maintaining an inverted state. The inverted vehicle includes specifying means for specifying a position at a predetermined distance from a step portion which a rider gets on or off, when the rider gets on or off the vehicle. The specifying means may project a predetermined shape onto the position at the predetermined distance from the step portion, or may cause a vehicle member to move to the position at the predetermined distance from the step portion. The inverted vehicle may further include position detecting means for detecting a position of a foot of the rider, and contact determining means for determining whether the foot is to contact the vehicle, based on the position of the foot detected by the position detecting means.

11 Claims, 9 Drawing Sheets

INVERTED VEHICLE AND METHOD OF GETTING ON/OFF THE INVERTED VEHICLE

This is a 371 national phase application of PCT/JP2010/005339 filed 30 Aug. 2010, the contents of which are incorporated herein by reference.

TECHNICAL FIELD

The present invention relates to an inverted vehicle that travels while maintaining an inverted state, and a method of getting on/off the inverted vehicle.

BACKGROUND ART

Inverted vehicles that travel while maintaining an inverted state are known (for example, see Patent Literature 1). In each of such inverted vehicles, a handle is generally mounted to be tilted forward so as to prevent the handle from interfering with a rider riding on the vehicle during traveling.

CITATION LIST

Patent Literature

PTL 1: Japanese Unexamined Patent Application Publication No. 2006-315666

SUMMARY OF INVENTION

Technical Problem

Figure 9:
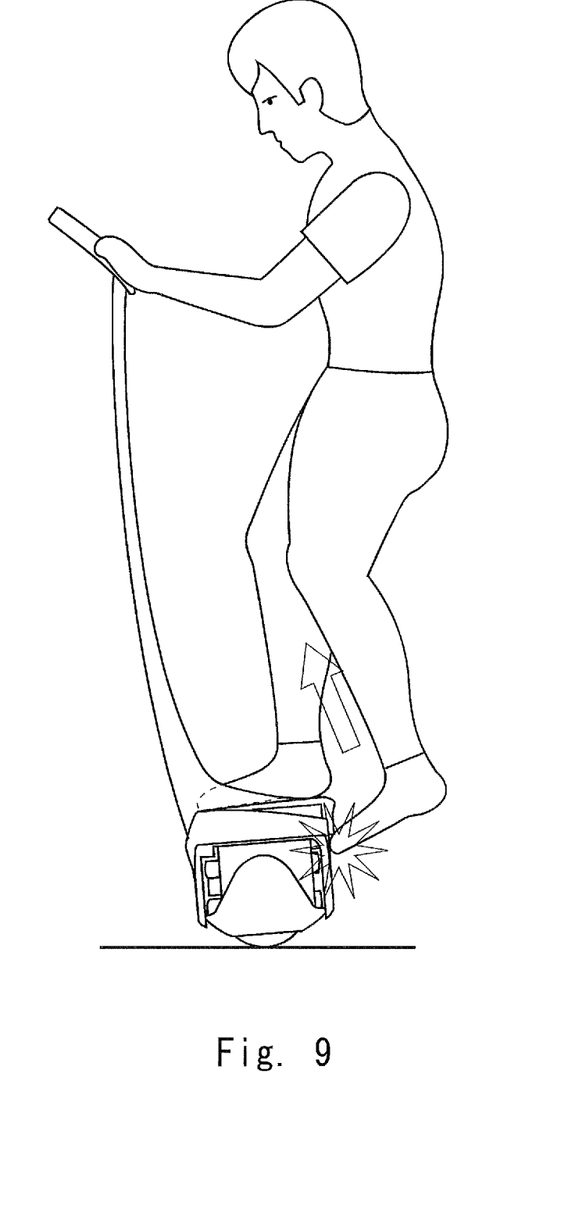
FIG. 9 is a diagram showing an example of a state where a foot of a rider is caught upon getting on or off the vehicle.
Figure 10:
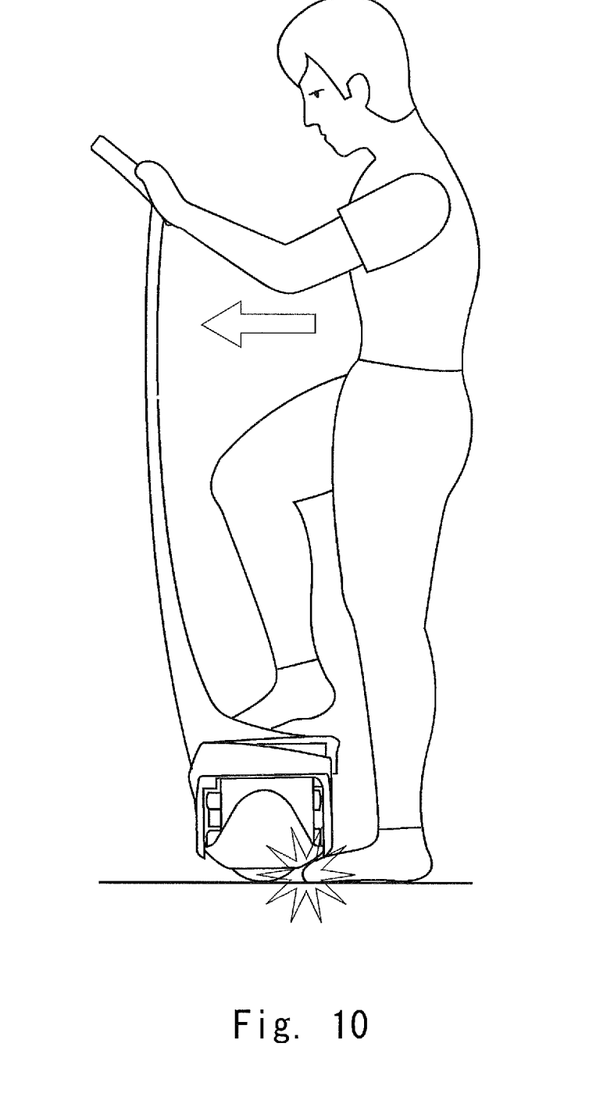
FIG. 10 is a diagram showing an example of a state where a foot of a rider gets caught in a driving wheel upon getting on or off the vehicle.

In such a configuration, a standing position of a rider is spaced apart from a step portion when the rider gets on the vehicle, for example, which makes it difficult for the rider to get on the step portion. Due to the difficulty in getting on the vehicle, the rider tends to be too close to the vehicle upon getting on the vehicle. This causes such a problem that a foot located at the back is caught by the vehicle (FIG. 9) or the foot gets caught in a wheel (FIG. 10), for example.

The present invention has been made to solve the above-mentioned problem, and it is a major object to provide an inverted vehicle that enables a rider to get on or off safely, and a method of getting on or off the inverted vehicle.

Solution to Problem

One aspect of the present invention to achieve the above-mentioned object is an inverted vehicle that travels while maintaining an inverted state, the inverted vehicle including specifying means for specifying a position at a predetermined distance from a step portion which a rider gets on or off, when the rider gets on or off the vehicle. This allows the rider to get on or off the vehicle safely according to the specification by the specifying means.

In this one aspect, the specifying means may project a predetermined shape onto the position at the predetermined distance from the step portion. This allows the rider to get on or off the vehicle safely and easily according to the projected predetermined shaped.

In this one aspect, the specifying means may move a vehicle member to the position at the predetermined distance from the step portion. This allows the rider to get on or off the vehicle safely and easily according to the position specified by the vehicle member.

In this one aspect, the specifying means may move an end of one of a fender portion and a bumper portion to the position at the predetermined distance from the step portion. This allows the rider to get on or off the vehicle safely and easily according to the position specified by the end of one of the fender portion and the bumper portion.

In this one aspect, the inverted vehicle may further include rider information acquisition means for acquiring information on the rider, and the specifying means may change the predetermined distance according to the information on the rider acquired by the rider information acquisition means. This enables specification of an optimum getting on/off position according to the characteristics of the rider.

In this one aspect, the inverted vehicle may further include road state detecting means for detecting a road state, and the specifying means may change the predetermined distance according to the road state detected by the road state detecting means. This enables specification of an optimum getting on/off position according to the road state.

In this one aspect, the inverted vehicle may further include position detecting means for detecting a position of a foot of the rider; and contact determining means for determining whether the foot is to contact the vehicle, based on the position of the foot detected by the position detecting means. This enables appropriate determination as to whether the foot of the rider is to contact the vehicle when the rider gets on or off the vehicle.

In this one aspect, the inverted vehicle may further include control means for controlling driving means for driving the vehicle, based on a determination result of the contact determining means. This enables appropriate determination as to whether the foot of the rider is to contact the vehicle when the rider gets on or off the vehicle, and appropriate control of the driving means.

In this one aspect, the control means may stop starting an inversion control when the contact determining means determines that the foot is to contact the vehicle when the rider gets on the vehicle. Thus, the inversion control is prevented from being started when there is a possibility that the foot of the rider contacts the vehicle, for example, thereby reliably preventing the foot of the rider from getting caught in wheel, for example.

In this one aspect, the inverted vehicle may further include warning means for issuing warning when the contact determining means determines that the foot is to contact the vehicle. This allows the rider to reliably recognize that there is a possibility that the rider's foot contacts the vehicle.

In this one aspect, when the contact determining means determines that the foot is to contact the vehicle, the control means may control driving of the driving means so as to set a distance between the step portion and the foot of the rider to the predetermined distance. This allows the distance between the step portion and the foot of the rider to be maintained at an appropriate distance even when the foot of the rider is too close to the vehicle, thereby enabling the rider to get on or off the vehicle safely and easily.

Another aspect of the present invention to achieve the above-mentioned object is a method of getting on or off an inverted vehicle that travels while maintaining an inverted state, the method including specifying a position at a predetermined distance from a step portion which a rider gets on or off, when the rider gets on or off the vehicle. This allows the rider to get on or off the vehicle safely according to the specified position.

Advantageous Effects of Invention

According to the present invention, it is possible to provide an inverted vehicle that enables a rider to get on or off the vehicle safely, and a method of getting on or off the inverted vehicle.

DESCRIPTION OF EMBODIMENTS

First Exemplary Embodiment

Figure 1:
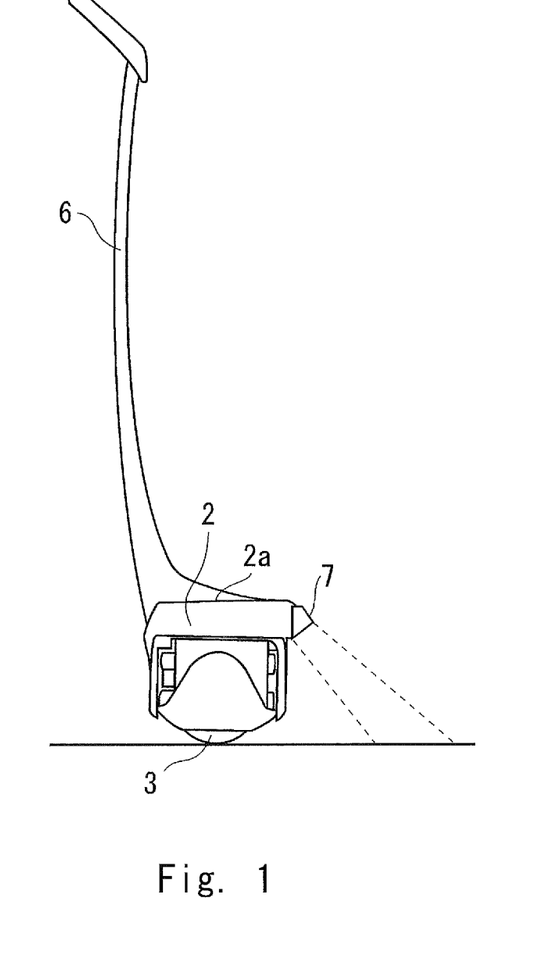
FIG. 1 is a side view showing a schematic configuration of an inverted vehicle according to a first exemplary embodiment of the present invention.
Figure 2:
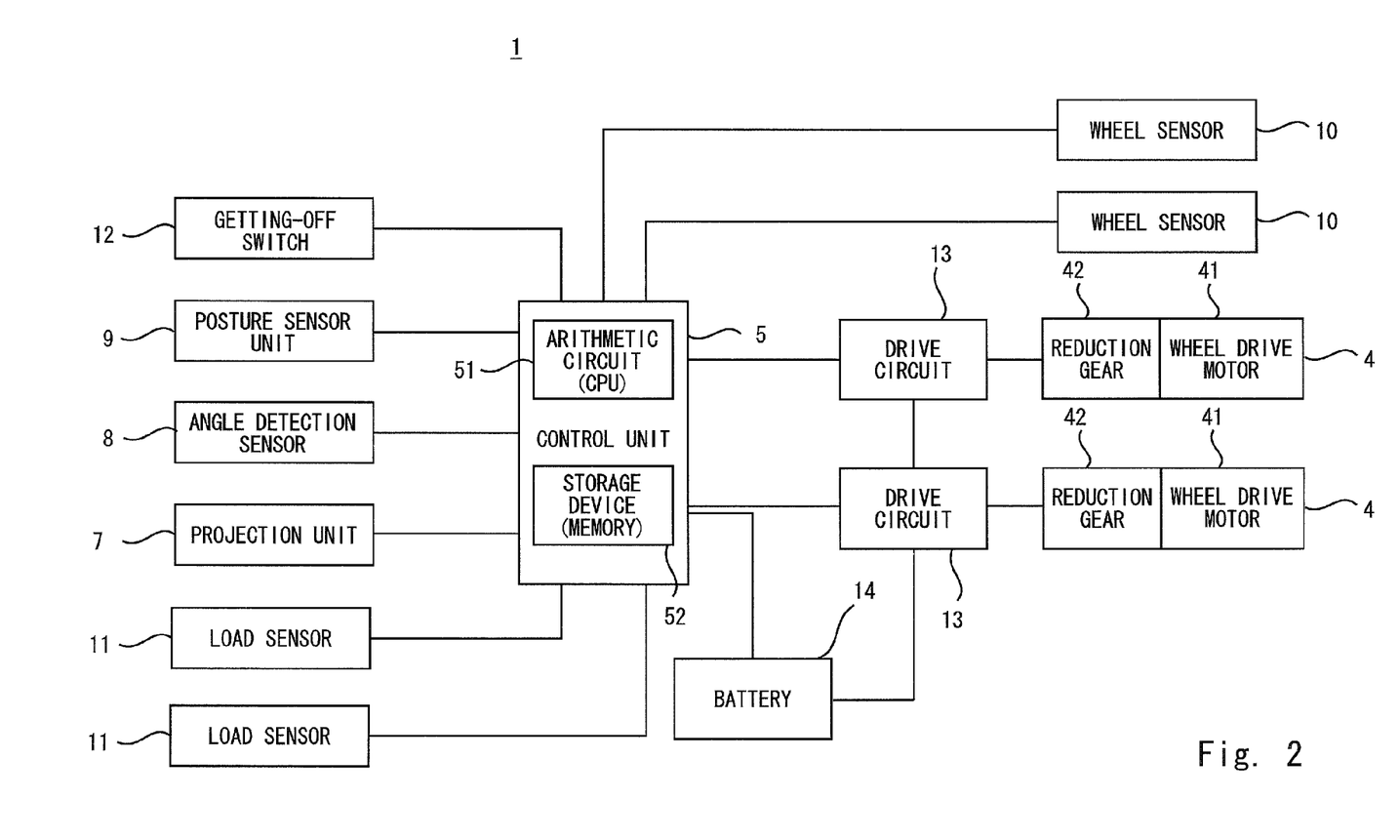
FIG. 2 is a block diagram showing a schematic system configuration of the inverted vehicle according to the first exemplary embodiment of the present invention.

Hereinafter, exemplary embodiments of the present invention will be described with reference to the drawings. FIG. 1 is a side view showing a schematic configuration of an inverted vehicle according to a first exemplary embodiment of the present invention. FIG. 2 is a block diagram showing a schematic system configuration of the inverted vehicle according to the first exemplary embodiment of the present invention.

An inverted vehicle 1 according to the first exemplary embodiment is constructed, for example, as an inverted two-wheel vehicle that performs a desired traveling action while maintaining an inverted state. The inverted vehicle 1 includes a vehicle main body 2, a pair of right and left driving wheels 3 rotatably mounted to the vehicle main body 2, a pair of wheel drive units 4 that rotationally drive the respective driving wheels 3, a control unit 5 that controls each of the wheel drive units 4, an operation handle 6 operably mounted to the vehicle main body 2, and a projection unit 7 that specifies an optimum getting on/off position of a rider.

The operation handle 6 is an operation unit. By inclining this operation unit in a forward/backward direction, the inverted two-wheel vehicle 1 performs a forward or backward movement. Further, by inclining the operation unit in a roll direction, the inverted two-wheel vehicle 1 performs a turning movement. Note that the roll axis is an axis that passes through the center of the vehicle main body 2 and is in parallel with the traveling direction of the inverted two-wheel vehicle 1. The operation handle 6 is mounted to be tilted forward so as not to interfere with the rider when the rider is riding on the vehicle.

The pair of driving wheels 3 are coaxially arranged on both sides of the vehicle main body 2 in the direction perpendicular to the traveling direction, and are rotatably supported on the vehicle main body 2.

Each of the wheel drive units 4 is a specific example of driving means that can independently and rotationally drive the pair of driving wheels 3. Each of the wheel drive units 4 can be composed of, for example, a wheel drive motor 41 and a reduction gear 42 that is coupled to the rotation shaft of the wheel drive motor 41 in such a manner that the power can be transferred from the rotation shaft to the reduction gear.

An angle detection sensor 8 that detects operation information (such as an operation amount and an operation direction) of the operation handle 6 is attached to the vehicle main body 2. For example, a potentiometer, a sensor having a variable-capacitor structure, or the like can be used as the angle detection sensor 8. The angle detection sensor 8 is connected to the control unit 5 and thereby outputs the detected operation information of the operation handle 6 to the control unit 5.

The vehicle main body 2 is provided with a posture sensor unit 9 that detects posture information such as a pitch angle, a pitch angular speed, and a pitch angular acceleration when the inverted two-wheel vehicle 1 is traveling. The posture sensor unit 9 is composed of, for example, a gyroscopic sensor, an acceleration sensor, and the like. When the rider inclines the operation handle 6 forward or backward, the vehicle main body 2 inclines in the same direction. This posture sensor unit 9 detects a pitch angle, a pitch angular speed, a pitch angular acceleration, and the like corresponding to this inclination. The posture sensor unit 9 is connected to the control unit 5 and thereby outputs the detected posture information to the control unit 5.

A pair of wheel sensors 10 that detect rotation information (such as a rotation angle, a rotation speed, and a rotation acceleration) of the respective driving wheels 3 are provided in the axles of the respective driving wheels 3. Each of the wheel sensors 10 is connected to the control unit 5 and thereby outputs the detected rotation information to the control unit 5.

On the upper surface of the vehicle main body 2, a pair of step portions 2a are provided on the left and right sides of the operation handle 6. Each of the step portions 2a is a plate member. The rider puts one foot on one of the step portions 2a and the other foot on the other of the step portions 2a when the rider gets on the vehicle.

The step portions 2a are respectively provided with load sensors 11 capable of detecting the load of each foot of the rider when the feet are put on the respective step portions. Each of the load sensors 11 is connected to the control unit 5 and thereby outputs the detected load value to the control unit 5. The control unit 5 can determine whether the rider puts the feet on the respective step portions 2a to get on the vehicle, or can determine whether the rider removes the feet from the respective step portions 2a to get off the vehicle, based on the load value obtained from the load sensor 11 of each step portion 2a. Note that the control unit 5 may determine whether the rider gets on or off the step portions 2a by using a mechanical switch or an optical switch which is provided in each step portion 2a, or by using any sensor or method.

Incidentally, a standing position for the rider to get on or off the vehicle main body is generally determined depending on the rider's own experience. For example, the standing position of the rider tends to be too close to the vehicle main body upon getting on or off the vehicle, which causes a problem in terms of safety.

In the first exemplary embodiment, the projection unit 7 specifies an appropriate getting on/off position for the rider upon getting on or off the vehicle. The projection unit 7 is a specific example of specifying means that is provided at an upper portion of the rear end of the vehicle main body 2. The projection unit 7 projects a predetermined shape, such as a line (a straight line, a curve, a dotted line, a solid line, etc), a figure (a circle, a square, a rectangle, etc.), or a character, onto a position at a predetermined distance S from each step portion 2a of the vehicle 2 on the road, when the rider gets on or off the vehicle. As will be described later, the projection unit 7 can be provided at any position of the vehicle, as long as the projection unit can appropriately project the predetermined shape onto the road.

The position at the predetermined distance S herein described refers to a position where the rider can get on or off the vehicle safety without the possibility that a foot of the rider is too close to the vehicle and is caught upon getting on or off the vehicle (FIG. 9), or the foot gets caught in a driving wheel (FIG. 10), for example. The position is preliminarily set to a storage device 52 which will be described later. Note that this predetermined distance may be arbitrarily set and changed by the rider through an input unit or the like. The projection unit 7 is composed of, for example, a light emitting portion such as an LED, and an optical member such as a condenser lens, and is configured to be able to appropriately project the predetermined shape onto the road. The projection unit 7 is connected to the control unit 5 and thereby starts or stops the projection according to a control signal supplied from the control unit 5.

When determining that a power supply of the inverted vehicle 1 is turned on, for example, the control unit 5 transmits the control signal to the projection unit 7, and the projection unit 7 starts projecting the predetermined shape onto the road according to the control signal. This allows the rider to get on the vehicle safely and easily according to the predetermined shape projected onto the road. When determining that the getting-on of the rider has been completed based on the load value output from the load sensor 11 of each step portion 2a, the control unit 5 transmits the control signal to the projection unit 7. The projection unit 7 stops the projection according to the control signal.

On the other hand, when determining that a getting-off switch 12 for starting a getting on/off control is turned on, for example, the control unit 5 transmits the control signal to the projection unit 7, and the projection unit 7 starts the projection of the predetermined shape onto the road according to the control signal. This allows the rider to get off the vehicle safely and easily according to the predetermined shape projected onto the road. When determining that the getting-off of the rider has been completed based on the load value output from the load sensor 11 of each step portion 2a, the control unit 5 transmits the control signal to the projection unit 7. The projection unit 7 stops the projection according to the control signal.

Note that the projection unit 7 uses the control signal as a trigger signal to start or stop the projection, but may also use any trigger signal as long as the projection can be performed when the rider gets on or off the vehicle.

Figure 3:
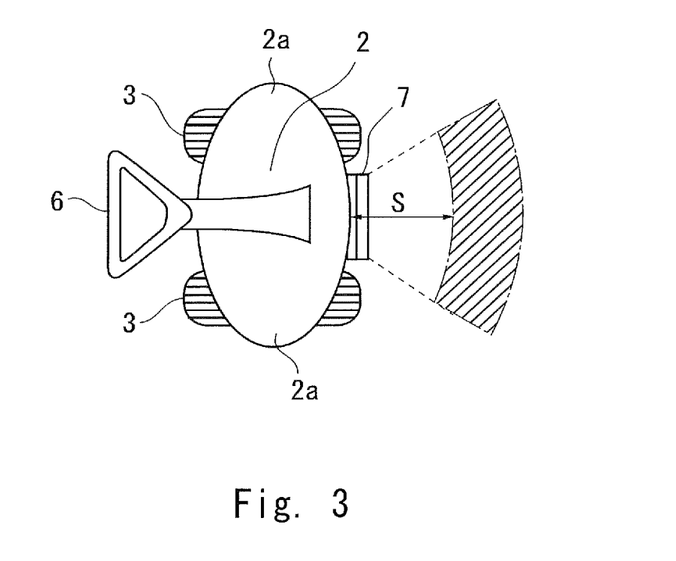
FIG. 3 is a top view showing an example of a predetermined shape projected onto a position at a predetermined distance from each step portion of a vehicle main body by a projection unit.
Figure 4:
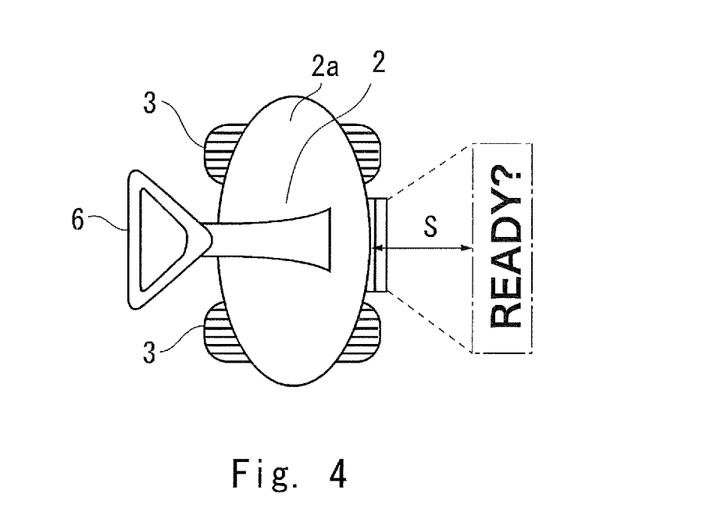
FIG. 4 is a top view showing an example of a message projected onto the position at the predetermined distance from each step portion of the vehicle main body by the projection unit.

As shown in FIG. 3, for example, the projection unit 7 projects an arcuate line onto the position at the predetermined distance S from each step portion 2a of the vehicle main body 2. The rider may stand on the line projected by the projection unit 7 as the standing position and may raise one foot from the line and put the foot on one of the step portions 2a, or may put one foot down on the line from one of the step portions 2a and get off the vehicle. This enables the rider to get on or off the vehicle safely and easily while maintaining an appropriate distance from the vehicle. Note that the projection unit 7 projects an arcuate line onto the position at the predetermined distance S from each step portion 2a of the vehicle main body 2, but the shape is not limited thereto. The projection unit 7 may also project a message, such as "READY?" (FIG. 4), and thus can project any shape.

The vehicle main body 2 incorporates drive circuits 13 that drive the pair of wheel drive units 4 and the like.

The control unit 5 executes predetermined arithmetic processing based on the posture information supplied from the posture sensor unit 9, the operation information supplied from the angle detection sensor 8, the rotation information supplied from each wheel sensor 10, and the like, and outputs a necessary control signal to each wheel drive unit 4. The control unit 5 controls each wheel drive unit 4 in response to a traveling operation by the rider, and thereby controls the driving of each driving wheel 3 and allows the inverted vehicle 1 to travel at a desired speed in a desired direction (for example, forward movement, backward movement, right turn, left turn, acceleration, deceleration, and standstill) while causing the inverted vehicle 1 to maintain the inverted state.

The control unit 5 includes, for example, an arithmetic circuit 51 including a microcomputer (CPU), and the storage device 52 including a program memory, a data memory, other RAMs and ROMs, and the like. The battery 14 is connected to each of the control unit 5 and the drive circuits 13 and supplies electric power thereto. Note that the above-described configuration of the inverted vehicle 1 is merely an example, and the present invention can be applied to any inverted vehicle that travels while maintaining the inverted state.

As described above, in the inverted vehicle 1 according to the first exemplary embodiment, the projection unit 7 projects the predetermined shape onto the position at the predetermined distance S from each step portion 2a of the vehicle main body 2 on the road, when the rider gets on or off the vehicle. This allows the rider to stand on the position of the predetermined shape projected by the projection unit 7 as the standing position and raise one foot from the predetermined shape to get on one of the step portions 2a, or to put one foot down on the predetermined shape from one of the step portions 2a to get off the vehicle. This enables the rider to get on or off the vehicle safely and easily while maintaining the appropriate distance constantly.

Note that in the first exemplary embodiment described above, the projection unit 7 projects the predetermined shape onto the standing position which is optimum for the rider to get on or off the vehicle and which is located at the predetermined distance S from each step portion 2a of the vehicle main body 2, but the present invention is not limited thereto. The predetermined shape may also be projected onto the standing position which is dangerous upon getting on or off the vehicle, for example. In this case, the projection unit 7 may project the predetermined shape in red, for example.

Furthermore, the projection unit 7 may project predetermined shapes in different colors onto the optimum standing position upon getting on or off the vehicle, and onto the standing position which is dangerous upon getting on or off the vehicle. In this case, for example, the projection unit 7 may project the predetermined shape in blue onto the appropriate standing position upon getting on or off the vehicle, and may project the predetermined shape in red onto the standing position which is dangerous upon getting on or off the vehicle. As a result, the appropriate standing position upon getting on or off the vehicle is clearly defined, thereby enabling the rider to get on or off the vehicle more safely.

Second Exemplary Embodiment

Figure 5:
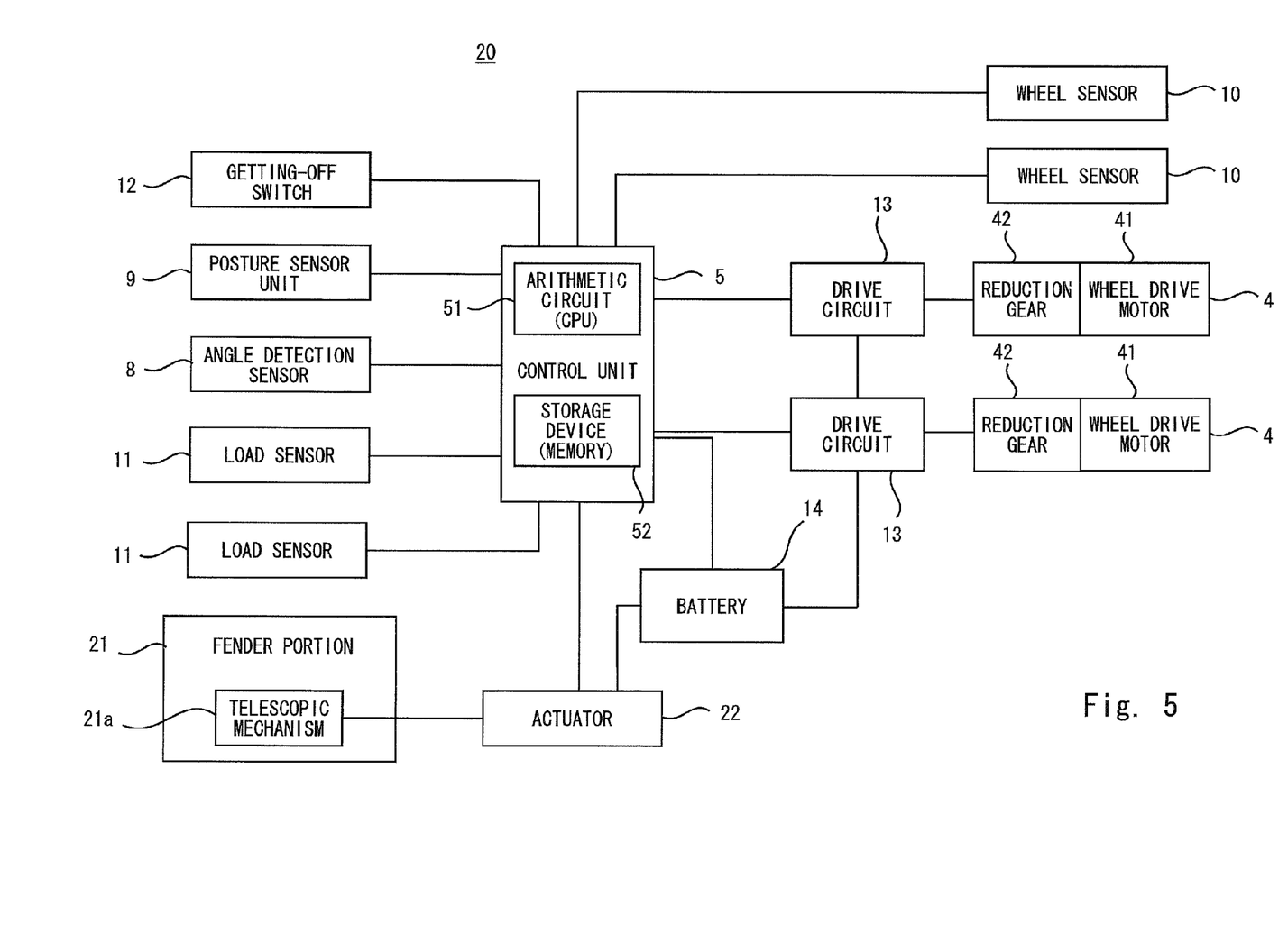
FIG. 5 is a block diagram showing a schematic system configuration of an inverted vehicle according to a second exemplary embodiment of the present invention.

FIG. 5 is a block diagram showing a schematic system configuration of an inverted vehicle according to a second exemplary embodiment of the present invention. The configuration of an inverted vehicle 20 according to the second exemplary embodiment differs from the configuration of the inverted vehicle 1 according to the first exemplary embodiment in that an appropriate getting on/off position for a rider is specified by moving a vehicle member.

The inverted vehicle 20 according to the second exemplary embodiment includes a fender portion 21 which is movable in a forward/backward direction, and an actuator 22, such as a servo motor, which moves the fender portion 21 in the forward/backward direction. The fender portion 21 is provided in the vehicle main body 2 and includes a telescopic mechanism 21a that can expand or contract in the forward/backward direction, which allows the rear end to move to the position at the predetermined distance S from each step portion 2a. The actuator 22 is connected to the control unit 5 and thereby allows the telescopic mechanism 21a of the fender portion 21 to expand or contract according to the control signal supplied from the control unit 5.

The other components of the inverted vehicle 20 according to the second exemplary embodiment are substantially the same as those of the inverted vehicle 1 according to the first exemplary embodiment. Accordingly, the same components are denoted by the same reference numerals and the detailed description thereof is omitted.

For example, when the rider gets on or off the vehicle, the actuator 22 allows the telescopic mechanism 21a of the fender portion 21 to expand or contract according to the control signal supplied from the control unit 5, thereby allowing the rear end to move to the position at the predetermined distance S from each step portion 2a. The rider may raise one foot from the position specified by the rear end of the fender portion 21 and get on one of the step portions 2a, or may put one foot down on the specified position from one of the step portions 2a and get off the vehicle. This enables the rider to get on or off the vehicle safely and easily while maintaining the appropriate distance.

Note that in the above description, the getting on/off position of the rider is specified by moving the fender portion 21, but the present invention is not limited thereto. The getting on/off position of the rider may be specified by moving a bumper portion, for example. Any vehicle member may be moved as long as the getting on/off position can be appropriately specified.

Third Exemplary Embodiment

Figure 6:
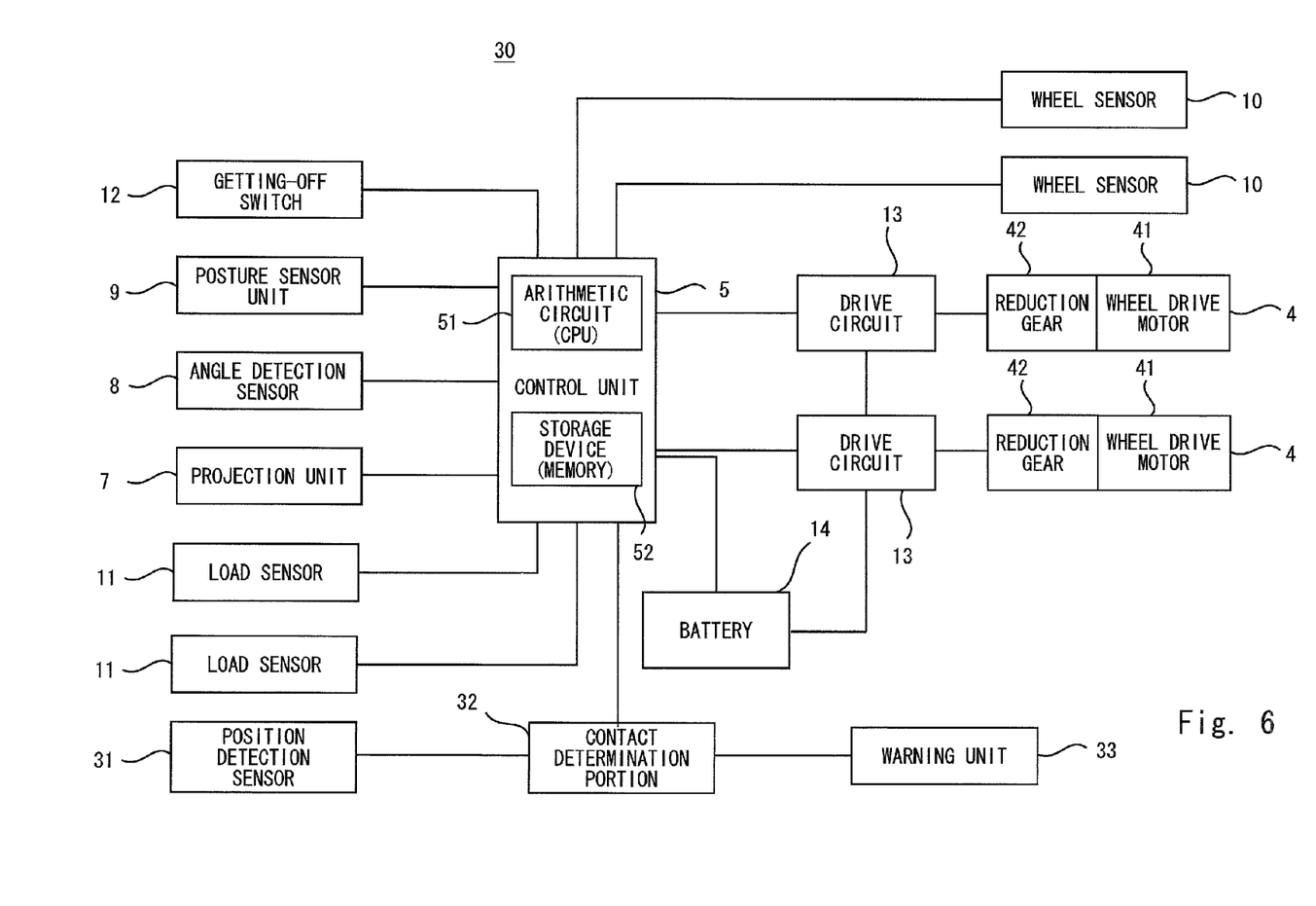
FIG. 6 is a block diagram showing a schematic system configuration of an inverted vehicle according to a third exemplary embodiment of the present invention.

FIG. 6 is a block diagram showing a schematic system configuration of an inverted vehicle according to a third exemplary embodiment of the present invention. In addition to the components of the inverted vehicle 1 according to the first exemplary embodiment, an inverted vehicle 30 according to the third exemplary embodiment includes a position detection sensor 31 that detects the position of each foot of the rider (hereinafter referred to as "foot position"), and a contact determination portion 32 that determines whether a foot of the rider is to contact the vehicle, based on the foot position detected by the position detection sensor 31.

The position detection sensor 31 is a specific example of position detecting means that is provided at an upper portion of the rear end of the vehicle main body 2, for example, and is composed of an ultrasonic sensor, a millimeter-wave sensor, a camera, or the like. The position detection sensor 31 outputs the detected foot position to the contact determination portion 32.

The contact determination portion 32 is a specific example of contact determining means, and determines whether there is a possibility that the foot of the rider contacts the vehicle. When determining that the foot position obtained from the position detection sensor 31 falls within a predetermined range from the vehicle main body 2, upon getting on the vehicle, for example, the contact determination portion 32 determines that there is a possibility that the foot of the rider approaches and contacts the vehicle. When determining that the foot of the rider is to contact the vehicle, the contact determination portion 32 outputs a determination signal to the control unit 5.

The control unit 5 controls each wheel drive unit 4 based on the determination result obtained by the contact determination portion 32. For example, the control unit 5 stops starting an inversion control, according to the determination signal output from the contact determination portion 32. Thus, the inversion control is prevented from being started even when there is a possibility that the foot of the rider approaches and contacts the vehicle upon getting on the vehicle. This makes it possible to prevent the foot from getting caught in the driving wheel 3, or from being caught, for example, resulting in an improvement in safety.

Furthermore, the control unit 5 may control the driving of each wheel drive unit 4 so as to set the distance between each step portion 2a and the foot position, which is obtained from the position detection sensor 31, to the predetermined distance S, according to the determination signal output from the contact determination portion 32. As a result, the appropriate distance between each foot of the rider and each step portion 2a can be maintained when the rider gets on the vehicle. This prevents the foot from getting caught in the driving wheel 3, or from being caught, for example, thereby enabling the rider to get on the vehicle safely and easily.

Note that in the third exemplary embodiment, when the contact determination portion 32 determines that the foot of the rider is to contact the vehicle, a warning may be issued by a warning unit 33. As the warning unit 33, for example, a sound output device that outputs warning sound, a lighting device that lights/blinks a warning lamp, a vibrating device that vibrates a portion in contact with a rider, such as the operation handle 6 or the step portions 2a, a display device that displays warning, or a reporting device that reports to a third party may be used. The warning unit 33 issues warning according to the determination signal output from the contact determination portion 32. The warning by the warning unit 33 may be executed in combination with the control of the wheel drive units 4 by the control unit 5, or may be executed singly. This allows the rider to easily recognize that the rider is too close to the vehicle main body 2 upon getting on or off the vehicle, and to appropriately correct the standing position.

The other components of the inverted vehicle 30 according to the third exemplary embodiment are substantially the same as those of the inverted vehicle 1 according to the first exemplary embodiment. Accordingly, the same components are denoted by the same reference numerals and the detailed description thereof is omitted.

Figure 7:
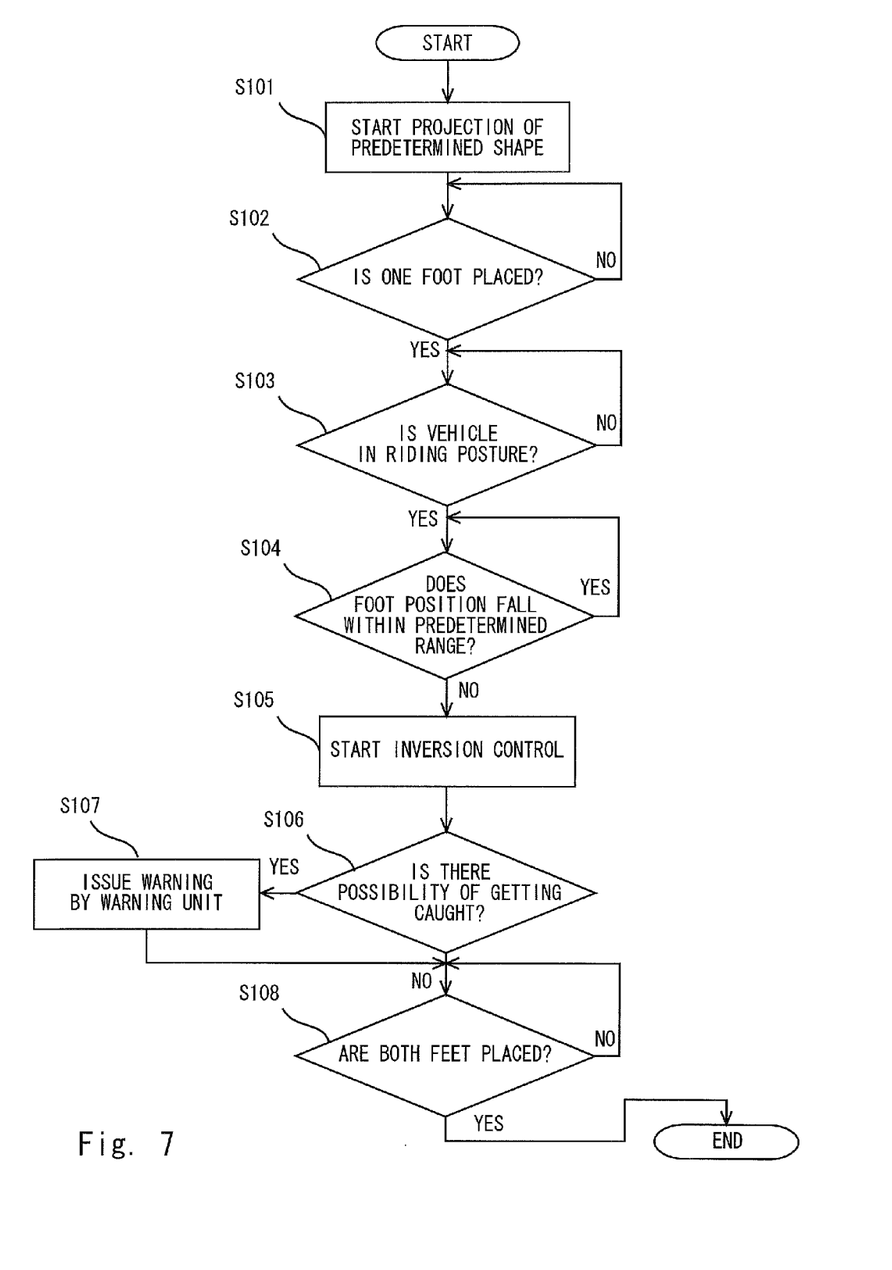
FIG. 7 is a flowchart showing an example of a getting-on process flow of the inverted vehicle according to the third exemplary embodiment of the present invention.

FIG. 7 is a flowchart showing an example of a getting-on process flow of the inverted vehicle according to the third exemplary embodiment.

For example, when determining that the power supply of the inverted vehicle 30 is turned on, the control unit 5 transmits the control signal to the projection unit 7, and the projection unit 7 starts projecting an arcuate line onto the position at the predetermined distance S from each step portion 2a according to the control signal (step S101). The rider stands on the arcuate line projected as the standing position, and starts getting on each step portion 2a of the vehicle main body 2.

The control unit 5 determines that one foot of the rider is put on one of the step portions 2a, based on the load value output from the load sensor 11 of each step portion 2a (YES in step S102). When determining that the vehicle main body 2 is in a riding posture, based on the posture information obtained from the posture sensor unit 9 (YES in step S103), the contact determination portion 32 determines whether the foot position obtained from the position detection sensor 31 falls within the predetermined range from the vehicle main body 2 (step S104).

When the contact determination portion 32 determines that the foot position obtained from the position detection sensor 31 falls outside the predetermined range from the vehicle main body 2 and that there is no possibility that the foot of the rider contacts the vehicle (NO in step S104), the control unit 5 starts the inversion control (step S105).

After that, when the contact determination portion 32 determines that the foot position obtained from the position detection sensor 31 falls within the predetermined range from the vehicle main body 2 and that there is a possibility that the foot gets caught (YES in step S 106), the warning unit 33 issues warning to the rider according to the determination signal output from the contact determination portion 32 (step S107). As described above, the control unit 5 may control the driving of each wheel drive unit 4 so as to set the distance between each step portion 2a and the foot position, which is obtained from the position detection sensor 31, to the predetermined distance S, according to the determination signal output from the contact determination portion 32.

On the other hand, when the contact determination portion 32 determines that the foot position obtained from the position detection sensor 31 falls outside the predetermined range from the vehicle main body 2 (NO in step S 106), and when the control unit 5 determines that both feet of the rider are placed on the respective step portions 2a, based on the load value output from the load sensor 11 of each step portion 2a (YES in step S108), this process is completed.

As described above, in the inverted vehicle 30 according to the third exemplary embodiment, it is determined whether there is a possibility that a foot of the rider contacts the vehicle, based on the foot position obtained from the position detection sensor 3, and each wheel drive unit 4 is controlled based on the determination result, or warning is issued by the warning unit 33. This reliably prevents contact between the foot of the rider and the driving wheel 3, or prevents the foot from getting caught or being caught, for example, upon getting on or off the vehicle, thereby enabling the rider to get on or off the vehicle more safely.

Fourth Exemplary Embodiment

Figure 8:
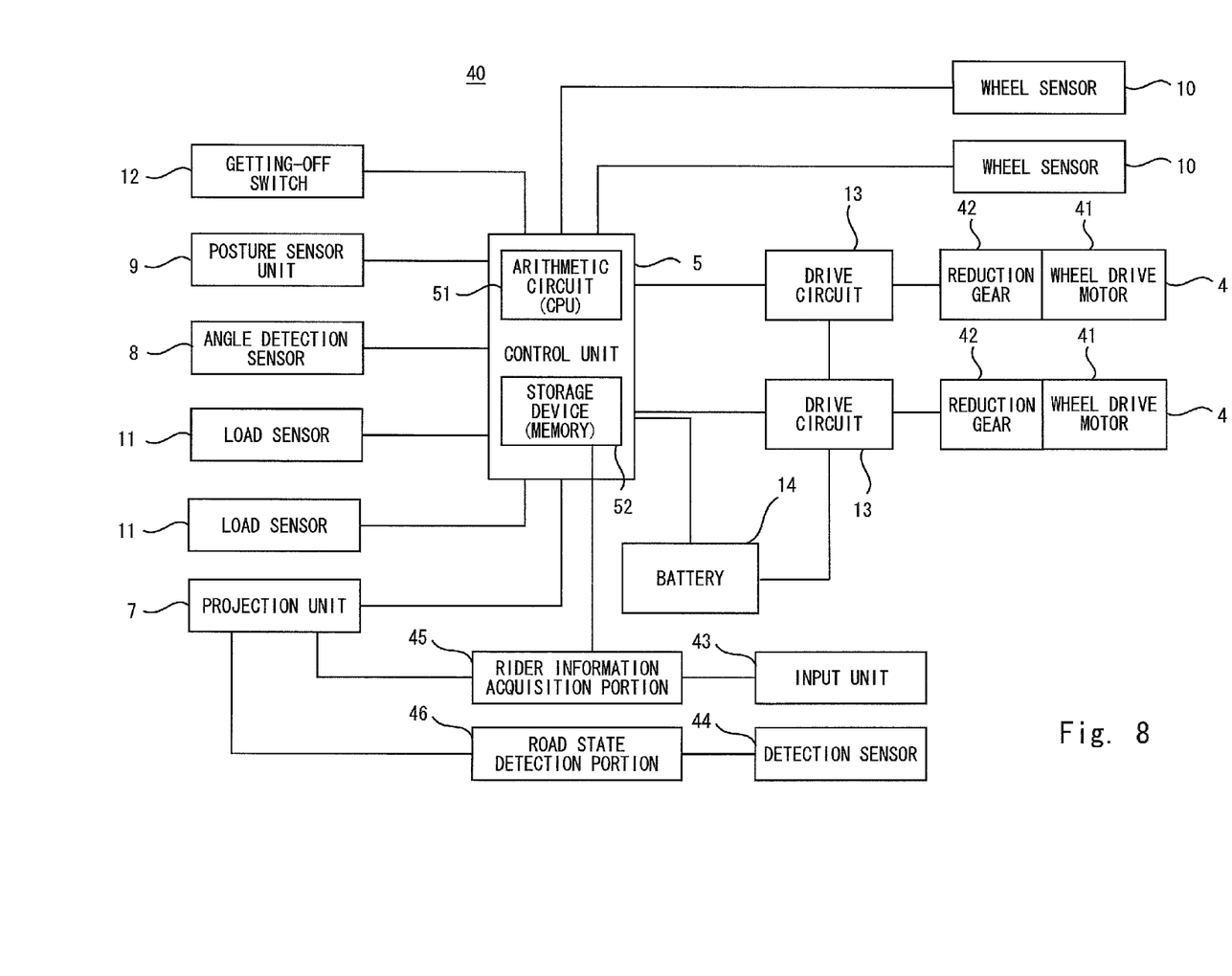
FIG. 8 is a block diagram showing a schematic system configuration of an inverted vehicle according to a fourth exemplary embodiment of the present invention.

FIG. 8 is a block diagram showing a schematic system configuration of an inverted vehicle according to a fourth exemplary embodiment of the present invention. In addition to the components of the inverted vehicle 1 according to the first exemplary embodiment, an inverted vehicle 40 according to the fourth exemplary embodiment includes a rider information acquisition portion 45 that acquires information on a rider, and a road state detection portion 46 that detects a road state.

The rider information acquisition portion 45 is a specific example of rider information acquisition means, and acquires information on the rider (hereinafter referred to as "rider information") through an input unit 43 or the storage device 52, for example. Examples of the rider information herein described include gender information (male or female), body information (height, weight, body type, physical defects, etc.), athletic performance (basic physical fitness, flexibility, etc.), and age of the rider. The rider information acquisition portion 45 is connected to the projection unit 7 and thereby outputs the acquired rider information to the projection unit 7.

The road state detection portion 46 is a specific example of road state detecting means, and can detect a road state (road inclination, road friction (road slipperiness), road unevenness, obstacles, etc.) by using an ultrasonic sensor, a millimeter-wave sensor, or a detection sensor 44 such as a camera, for example. The road state detection portion 46 is connected to the projection unit 7 and thereby outputs the detected road state to the projection unit 7.

The projection unit 7 preferably changes the predetermined distance S when the predetermined shape is projected onto the road, according to the rider information output from the rider information acquisition portion 45. For example, the projection unit 7 may set the predetermined distance S to be longer than the normal predetermined distance when it is determined that the rider is tall based on the rider information output from the rider information acquisition portion 45. Further, when it is determined that the rider is old based on the rider information output from the rider information acquisition portion 45, the projection unit 7 may set the predetermined distance S to be shorter than the normal predetermined distance. Thus, the appropriate getting on/off position is specified according to the characteristics of the rider, thereby enabling the rider to get on or off the vehicle more safely.

The projection unit 7 preferably changes the predetermined distance S when the predetermined shape is projected onto the road, according to the road state output from the road state detection portion 46. For example, the projection unit 7 may set the predetermined distance S to be shorter than the normal predetermined distance when the road state output from the road state detection portion 46 indicates that the road is inclined. Further, the projection unit 7 may set the predetermined distance S to be shorter than the normal predetermined distance when the road friction output from the road state detection portion 46 is low (slippery road). Thus, the appropriate getting on/off position is specified according to the road state, thereby enabling the rider to get on or off more safely.

In the fourth exemplary embodiment, the projection unit 7 may change the predetermined distance S when the predetermined shape is projected onto the road, according to time information output from a clocking device. Furthermore, the projection unit 7 may change the predetermined shape to be projected onto the road, according to the rider information output from the rider information acquisition portion 45 or the road state output from the road state detection portion 46.

The other components of the inverted vehicle 40 according to the fourth exemplary embodiment are substantially the same as those of the inverted vehicle 1 according to the first exemplary embodiment. Accordingly, the same components are denoted by the same reference numerals and the detailed description thereof is omitted. Note that the present invention is not limited to the above exemplary embodiments, but may be appropriately changed without departing from the gist of the present invention. For example, the configurations described in the first to fourth exemplary embodiments may be arbitrarily combined.

In the exemplary embodiments described above, the present invention has been described as a hardware configuration, but the present invention is not limited thereto. The present invention can also implement the above-described processing by causing a CPU (Central Processing Unit) to execute a computer program. For example, control processing for the contact determination portion 32, the rider information acquisition portion 45, the road state detection portion 46, and the control unit 5 can be implemented using a program.

The program can be stored and provided to a computer using various types of non-transitory computer readable media. Non-transitory computer readable media include various types of tangible storage media. Examples of non-transitory computer readable media include magnetic storage media (such as floppy disks, magnetic tapes, and hard disk drives), optical magnetic storage media (such as magneto-optical disks), CD-ROM (Read Only Memory), CD-R, CD-R/W, and semiconductor memories (such as mask ROM, PROM (Programmable ROM), EPROM (Erasable PROM), flash ROM, and RAM (Random Access Memory)).

The program may be provided to a computer using various types of transitory computer readable media. Examples of transitory computer readable media include electric signals, optical signals, and electromagnetic waves. Transitory computer readable media can provide the program to a computer via a wired communication line, such as electric wires or optical fibers, or a wireless communication line.

INDUSTRIAL APPLICABILITY

The present invention is applicable to any inverted vehicle that performs a desired traveling action while maintaining an inverted state, and to a method of getting on or off the inverted vehicle.

REFERENCE SIGNS LIST

1 INVERTED VEHICLE
2 VEHICLE MAIN BODY
3 DRIVING WHEEL
4 WHEEL DRIVE UNIT
5 CONTROL UNIT
6 OPERATION HANDLE
7 PROJECTION UNIT
8 ANGLE DETECTION SENSOR
9 POSTURE SENSOR UNIT
21 FENDER PORTION
22 ACTUATOR
31 POSITION DETECTION SENSOR
32 CONTACT DETERMINATION PORTION
33 WARNING UNIT
45 RIDER INFORMATION ACQUISITION PORTION
46 ROAD STATE DETECTION PORTION

The invention claimed is:

1. An inverted vehicle that travels while maintaining an inverted state, the inverted vehicle comprising:
a specifying unit that specifies a position at a predetermined distance from a step portion which a rider gets on or off, the position being a position where the rider can get on or off the vehicle safely, when the rider gets on or off the vehicle,
wherein the specifying unit projects a predetermined shape onto the position at the predetermined distance from the step portion, the position being different from a position of the step portion, and being a position of a foot of a rider to get on or off the vehicle.

2. The inverted vehicle according to claim 1, wherein the specifying unit moves a vehicle member to the position at the predetermined distance from the step portion.

3. The inverted vehicle according to claim 1, wherein the specifying unit moves an end of one of a fender portion and a bumper portion to the position at the predetermined distance from the step portion.

4. The inverted vehicle according to claim 1, further comprising a rider information acquisition unit that acquires information on the rider,
wherein the specifying unit changes the predetermined distance according to the information on the rider acquired by the rider information acquisition unit.

5. The inverted vehicle according to claim 1, further comprising a road state detecting unit that detects a road state,
wherein the specifying unit changes the predetermined distance according to the road state detected by the road state detecting unit.

6. The inverted vehicle according to claim 1, further comprising:
a position detecting unit that detects a position of a foot of the rider; and
a contact determining unit that determines whether the foot is to contact the vehicle, based on the position of the foot detected by the position detecting unit.

7. The inverted vehicle according to claim 6, further comprising a control unit that controls a driving unit that drives the vehicle, based on a determination result of the contact determining unit.

8. The inverted vehicle according to claim 6, wherein the control unit stops starting an inversion control when the contact determining unit determines that the foot is to contact the vehicle when the rider gets on the vehicle.

9. The inverted vehicle according to claim 6, further comprising a warning unit that issues a warning when the contact determining unit determines that the foot is to contact the vehicle.

10. The inverted vehicle according to claim 6, wherein when the contact determining unit determines that the foot is to contact the vehicle, the control unit controls driving of the driving unit so as to set a distance between the step portion and the foot of the rider to the predetermined distance.

11. A method of getting on or off an inverted vehicle that travels while maintaining an inverted state, the method comprising:
specifying a position at a predetermined distance from a step portion which a rider gets on or off, the position being a position where the rider can get on or off the vehicle safely, when the rider gets on or off the vehicle, and
specifying a predetermined shape onto the position at the predetermined distance from the step portion, the position being different from a position of the step portion, and being a position of a foot of a rider to get on or off the vehicle.

* * * * *